United States Patent
Zhang et al.

(10) Patent No.: US 10,749,577 B2
(45) Date of Patent: Aug. 18, 2020

(54) ENABLING A SECONDARY CELL IN A MASSIVE MIMO SYSTEM

(71) Applicant: Intel IP Corporation, Santa Clara, CA (US)

(72) Inventors: Yushu Zhang, Beijing (CN); Wenting Chang, Beijing (CN); Yuan Zhu, Beijing (CN); Huaning Niu, Milpitas, CA (US); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/080,580

(22) PCT Filed: Aug. 30, 2016

(86) PCT No.: PCT/US2016/049427
§ 371 (c)(1),
(2) Date: Aug. 28, 2018

(87) PCT Pub. No.: WO2017/151185
PCT Pub. Date: Sep. 8, 2017

(65) Prior Publication Data
US 2019/0028150 A1 Jan. 24, 2019

Related U.S. Application Data

(63) Continuation of application No. PCT/CN2016/075262, filed on Mar. 1, 2016.

(51) Int. Cl.
*H04B 7/024* (2017.01)
*H04W 74/08* (2009.01)
(Continued)

(52) U.S. Cl.
CPC .......... *H04B 7/024* (2013.01); *H04B 7/022* (2013.01); *H04B 7/0413* (2013.01);
(Continued)

(58) Field of Classification Search
None
See application file for complete search history.

(56) References Cited

U.S. PATENT DOCUMENTS

| 2015/0078261 A1 | 3/2015 | Yu et al. |
| 2015/0223156 A1 | 8/2015 | Park et al. |

(Continued)

FOREIGN PATENT DOCUMENTS

| TW | 201739189 A | 11/2017 |
| WO | WO-2014165712 A1 | 10/2014 |

OTHER PUBLICATIONS

"International Application Serial No. PCT/US2016/049427, International Search Report dated Nov. 28, 2016", 3 pgs.

(Continued)

*Primary Examiner* — Saba Tsegaye
(74) *Attorney, Agent, or Firm* — Kowert, Hood, Munyon, Rankin & Goetzel, P.C.

(57) ABSTRACT

Embodiments of enabling a secondary cell in a massive MIMO system are generally described herein. An example apparatus of UE may include memory and processing circuitry to configure a MIMO transceiver to establish primary cell transmit and receive channels for communication with an eNodeB, and to receive a secondary cell addition signal that includes a preamble index for a secondary cell. The processing circuitry further configures the MIMO transceiver to receive beam reference signals (BRS), and select one of the BRS from the eNodeB as a secondary cell transmit channel for the secondary cell based on detected BRS receive power. The processing circuitry further configures the MIMO transceiver to provide information for the selected BRS, and provide xPRACH transmissions that include a transmit index to the eNodeB. The processing circuitry further configures the MIMO transceiver to receive (Continued)

selection of one of the xPRACH transmissions as a secondary cell receive channel.

23 Claims, 9 Drawing Sheets

(51) Int. Cl.
    *H04L 5/00*         (2006.01)
    *H04B 7/0413*    (2017.01)
    *H04W 76/27*     (2018.01)
    *H04W 76/15*     (2018.01)
    *H04B 7/022*     (2017.01)

(52) U.S. Cl.
    CPC ....... *H04L 5/0048* (2013.01); *H04W 74/0833* (2013.01); *H04W 76/15* (2018.02); *H04W 76/27* (2018.02)

(56) References Cited

U.S. PATENT DOCUMENTS

| | | |
|---|---|---|
| 2015/0271744 A1 | 9/2015 | Liu et al. |
| 2015/0382205 A1* | 12/2015 | Lee .................. H04B 7/0417 370/329 |
| 2016/0007406 A1 | 1/2016 | Yi et al. |
| 2016/0044548 A1* | 2/2016 | Choi .................. H04W 36/04 370/331 |
| 2018/0359790 A1* | 12/2018 | Ingale .................. H04W 8/24 |

OTHER PUBLICATIONS

"International Application Serial No. PCT/US2016/049427, Written Opinion dated Nov. 28, 2016", 7 pgs.

\* cited by examiner

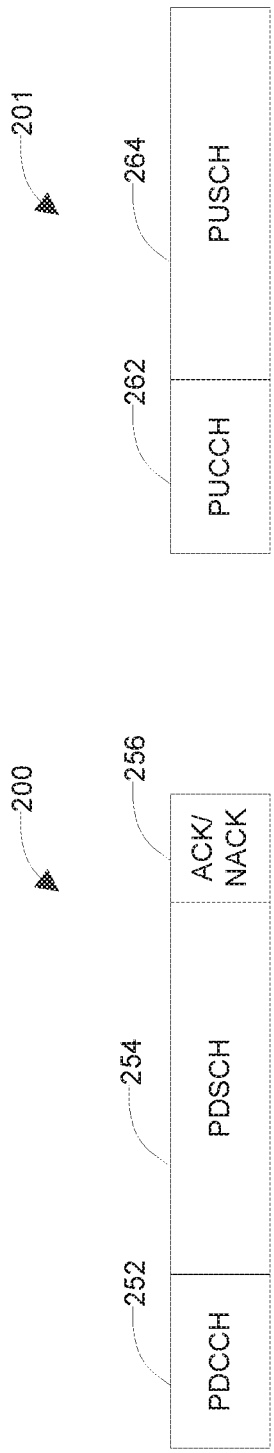
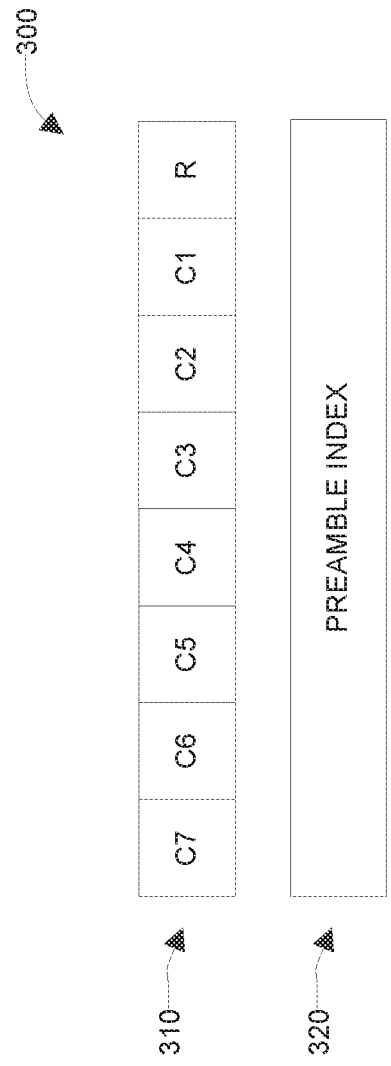
FIG. 2A
FIG. 2B
FIG. 3

ENABLING A SECONDARY CELL IN A MASSIVE MIMO SYSTEM

PRIORITY CLAIM

This patent application is a U.S. National Stage Filing under 35 U.S.C. 371 from International Application No. PCT/US2016/049427, filed Aug. 30, 2016 and published in English as WO 2017/151185 on Sep. 8, 2017, which is a continuation of and claims priority under 35 U.S.C. § 120 to International Application No. PCT/CN2016/075262, entitled "ENABLING SECONDARY CELL IN MASSIVE MIMO SYSTEM," filed on Mar. 1, 2016, each of which is hereby incorporated by reference herein in its entirety.

TECHNICAL FIELD

Embodiments pertain to cellular networks. Some embodiments relate to carrier aggregation in Third Generation Partnership Project Long Term Evolution (3GPP LTE) networks and LTE advanced (LTE-A) networks, as well as $4^{th}$ generation (4G) networks and $5^{th}$ generation (5G) networks.

BACKGROUND

A massive Multiple Input and Multiple Output (MIMO) may be applied in the 5G system to enhance the coverage and improve the spectrum efficiency. In a massive MIMO system, an evolved node B (eNodeB) may maintain a number of Transmitting (Tx) and Receiving (Rx) beams. Carrier aggregation may present challenges in enabling a primary and secondary cell for simultaneous communication.

BRIEF DESCRIPTION OF THE DRAWINGS

FIGS. 2A and 2B diagrams of exemplary frame structures for signal transmissions device in accordance with some embodiments of the disclosure.

FIG. 3 illustrates of an exemplary frame structure for a medium access control control element signal device in accordance with some embodiments of the disclosure.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments provide systems and methods for enabling a secondary cell in a massive MIMO system. In some implementations, a best (highest power) Tx beam may be selected by the Beam Reference Signal Receiving Power (BRS-RP) measured from BRS and the best Rx beam may be obtained by the Rx beam scanning in Physical Random Access Channel (xPRACH). Some 5G systems may implement carrier aggregation to increase the throughput (e.g., through primary component carrier serving a primary serving cell (PCell) and a secondary component carrier serving a secondary cell (SCell)). In some 5G implementations, the PCell and the SCell may come from a same eNodeB or they may each come from a different eNodeB. In massive MIMO systems, determining and exchanging the downlink Tx beam and uplink Rx beam information for the SCell may present issues when the PCell and the SCell come from different eNodeBs.

Figure 1:
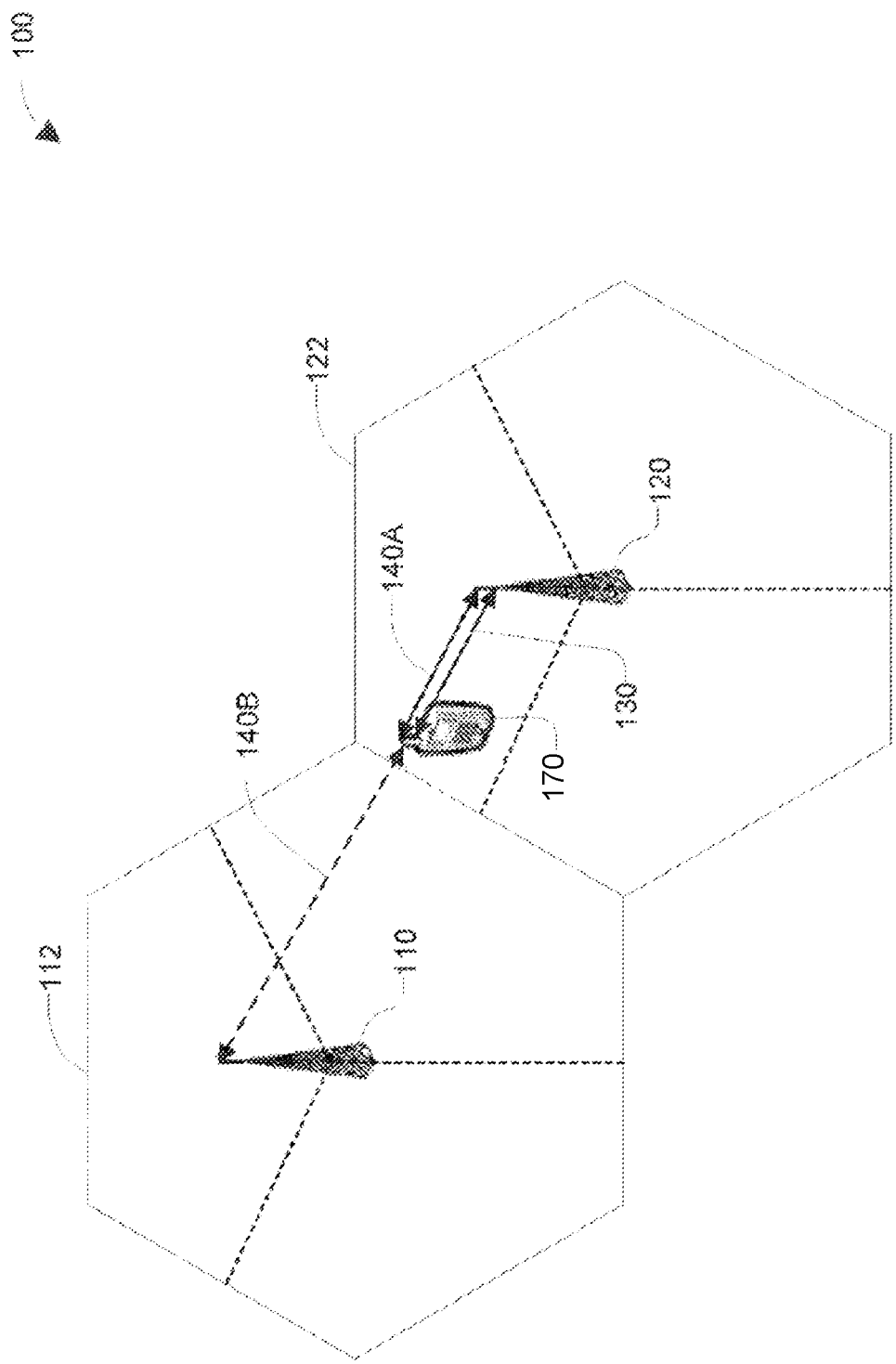
FIG. 1 illustrates a wireless telecommunications network in accordance with some embodiments of the disclosure.

FIG. 1 illustrates a wireless telecommunications network 100 in accordance with some embodiments of the disclosure. The illustrative telecommunications network includes an evolved Node B (eNodeB) 110 and an eNodeB 120. A telecommunications network may include many more eNodeBs. Each of the eNodeB 110 and the eNodeB 120 are operable over corresponding coverage areas or cells 112 and 122, respectively. Each base station's coverage area 112 and 122 may be further divided into three sectors (defined by the dotted lines from the eNodeB 110 and the eNodeB 120 respectively). In some examples, each sector of the eNodeB 110 and the eNodeB 120 can be also viewed as a cell. Handset or other user equipment (UE) 170 is shown in a sector within the coverage area of the eNodeB 120. The UE 170 may provide transmissions to and receive transmissions from the eNodeB 120 via a 130. The UE 170 may also provide transmissions to and receive transmissions from the eNodeB 120 via a secondary cell (SCell) 140A, in some examples. In other examples, the UE 170 may provide transmissions to and receive transmissions from the eNodeB 110 via a SCell 140B. As the UE 170 moves out of the coverage area 122 of the eNodeB 120 and into the coverage area 112 of the eNodeB 110, the UE 170 may be handed over to a sector of the eNodeB 110. In some embodiments, the wireless telecommunications network 100 may be a massive MIMO system, with each of the eNodeB 110 and the eNodeB 120 having more than 8 antennas (e.g., including 100 or more antennas in some examples), and the UE 170 including multiple antennas for communication.

In some examples, the eNodeB 110, the eNodeB 120 and the UE 170 may be implement carrier aggregation to increase throughput. That is, the eNodeB 110, the eNodeB 120, and the UE 170 may communicate through a primary component carrier serving a primary serving cell (PCell) 130 and through a secondary component carrier serving a secondary cell (SCell)) 140A or 140B. As shown, the SCell may be established with the same eNodeB as the PCell 130 (e.g., SCell 140A) or with a different eNodeB SCell 140B). In some examples, the wireless telecommunications network 100 may be capable of communicating using more than one secondary cell each served by a corresponding different component carrier.

In operation, the wireless telecommunications network 100 may include a massive MIMO architecture that implements carrier aggregation to increase throughput. In the example shown, the UE 170 may establish the PCell 130 with the eNodeB 120 and the SCell 140A or 140B. In some examples, the wireless telecommunications network 100 may implement 3rd Generation partnership Project (3GPP) fifth generation (5G) wireless network or 3rd Generation partnership Project (3GPP) long term evolution advanced (LTE-A) wireless network.

For communication over the PCell 130 and the SCell 140A or 140B, the wireless telecommunications network 100 may use a self-contained frame structure in which control signaling and data may be transmitted with a single subframe in a time-division multiplexing (TDM) manner. For example, there may be two types of frame structure: one for downlink data transmission and another for uplink data transmission. As an example, FIG. 2A depicts a downlink data transmission 200 and FIG. 2B depicts an uplink data transmission 201. The downlink data transmission 200 may include a physical downlink control channel (PDCCH) 252, a physical downlink shared channel (PDCCH) 254 and an acknowledgement (ACK/NACK) 256. The uplink data transmission 201 may include a physical uplink control channel (PUCCH) 262 and a physical uplink shared channel (PUSCH) 264.

If the UE 170 is full-duplex capable (e.g., capable of transmitting on one of the PCell 130 or the SCell 140A or 140B and receiving on the other, contemporaneously) and if the SCell 140A or 140B is enabled, the PCell 130 may use the 200 and the SCell 140A or 140B may use the 201 in one subframe, or vice versa. In some examples, the UE 170 may notify the eNodeB 120 that it is full-duplex capable. In another example, the wireless telecommunications network 100 may pre-define all UEs as being full-duplex capable.

Because the wireless telecommunications network 100 is a massive MIMO system, the eNodeB 110 and the eNodeB 120 may each be capable of maintaining a number of transmitting (Tx) and receiving (Rx) beams. Establishment of the PCell 130 may be performed after initial access is established with the eNodeB 120, and establishment of the SCell 140A or 140B may be performed after establishment of the PCell 130.

For the PCell 130, beam acquisition/selection for the downlink Tx (e.g., transmit channel from the eNodeB 110 or the eNodeB 120 and receive channel at the UE 170) and uplink Tx (e.g., receive channel at the eNodeB 110 or the eNodeB 120 and transmit channel from the UE 170) may be performed to establish the PCell 130. In some examples, beam acquisition/selection for the downlink Tx may be based on beam reference signal-receiving power (BRS-RP) at the UE 170 and for the uplink Tx may be established by selecting a Rx beam by scanning extra physical random access channel (xPRACH) transmissions at the eNodeB 120.

After establishment of the PCell 130, the eNodeB 120 and/or the eNodeB 110 and the UE 170 may establish the SCell 140A or 140B when the UE 170 is full-duplex capable. Establishment of the SCell 140A or 140B may be initiated directly by the eNodeB 120 or may be responsive to a measurement event triggered by the UE 170. For example, a massive MIMO transceiver of the eNodeB 120 may send a SCell addition message via the PCell 130 to a MIMO transceiver of the UE 170. In another example, in response to the UE 170 detecting that the BRS-RP value of a new cell is larger than a current cell by a threshold amount, the UE 170 may trigger a measurement event by sending a request via the PCell 130 to the massive MIMO transceiver of the eNodeB 120 to add the new cell. For example, when the current SCell is the SCell 140A, the UE 170 may trigger a measurement event by sending a request via the PCell 130 to the eNodeB 120 to add the SCell 140B when the UE 170 detects that the BRS-RP associated with the SCell 140B exceeds the BRS-RP associated with the SCell 140A by the threshold amount. In some examples, the request may include the BRS-RP that is associated with the measurement event. The threshold value may be configured via the PCell 130 signaling. In some examples, the downlink Tx and/or the uplink Tx for the SCell 140A or 140B may be determined based on information included in the measurement event request sent by the UE 170. For example, the request may include the selected BRS information for the downlink Tx and the uplink Tx may be derived from the BRS information.

Because the SCell 140A or 140B may be on either the eNodeB 110 or the eNodeB 120, establishment of the SCell 140A or 140B may include an xPRACH transmission to initiate access to the network of either the eNodeB 110 or the eNodeB 120. The eNodeB 120 may send a preamble index to the UE 170 via the PCell 130 the SCell addition message. The SCell addition message may be higher level signaling (e.g., radio resource control (RRC) signaling, etc.). The preamble index may define when the xPRACH transmissions should occur and where the xPRACH transmissions should be sent. For beam acquisition/selection, the massive MIMO transceiver of the eNodeB 120 or the eNodeB 110 may provide BRSs to the UE 170 to establish the downlink Tx (e.g., transmit channel from the eNodeB 110 or the eNodeB 120 and receive channel at the UE 170) for the SCell 140A or 140B. The MIMO transceiver of the UE 170 may detect BRS-RP for each of the BRSs and may select the BRS having the highest BRS-RP for the downlink Tx.

Based on the received preamble index, the UE 170 may calculate a transmit index (Tx Index). In some examples, the transmit index may be calculated using the following equation:

$$Tx\ Index = N_g * g + y$$

where $N_g$ indicates a number of preamble in a single preamble group, g represents the group index (e.g., which may be determined by the BRS-RP, in some examples), and y represents the preamble index received from the eNodeB 120. For beam acquisition/selection, the MIMO transceiver of the UE 170 may provide the xPRACH transmissions to the massive MIMO transceiver of the eNodeB 110 or the eNodeB 120 (e.g., whichever is being used to establish the SCell 140A or 140B) in a subframe. The massive MIMO transceiver of the eNodeB 110 or the eNodeB 120 may scan for the xPRACH transmissions in the subframe and may the select a best (e.g., having the highest signal power) of the xPRACH transmissions as the uplink Tx (e.g., receive channel from the eNodeB 110 or the eNodeB 120 and transmit channel at the UE 170).

The eNodeB 110 or the eNodeB 120 may determine the downlink Tx by decoding the transmit index for the selected xPRACH transmission, in some examples. In other examples, the eNodeB 110 or the eNodeB 120 may provide a random access response (RAR) message and the UE 170 may response to the RAR with a message (e.g., a Message 3) that includes the BRS-RP information.

After beam acquisition/selection, the activation/deactivation of the SCell 140A or 140B may be controlled via a medium access control (MAC) control element (CE). In an example, the massive MIMO transceiver of the eNodeB 110 or the eNodeB 120 may include a preamble index in the MAC CE, and the MIMO transceiver of the UE 170 provide a xPRACH transmission (e.g., similar to the xPRACH transmission for beam acquisition/selection for the SCell 140A or 140B) having a transmit index based on the preamble index in the SCell 140A or 140B to activate the SCell 140A or 140B. The SCell 140A or 140B may be deactivated by providing an invalid preamble index in the MAC CE. As an example, FIG. 3 depicts an exemplary MAC CE 300. The exemplary MAC CE 300 may include a first word 310 identifies a target cell (e.g., C1-C7) to be activated or deactivated and a second word 320 that includes the preamble index.

Figure 4:
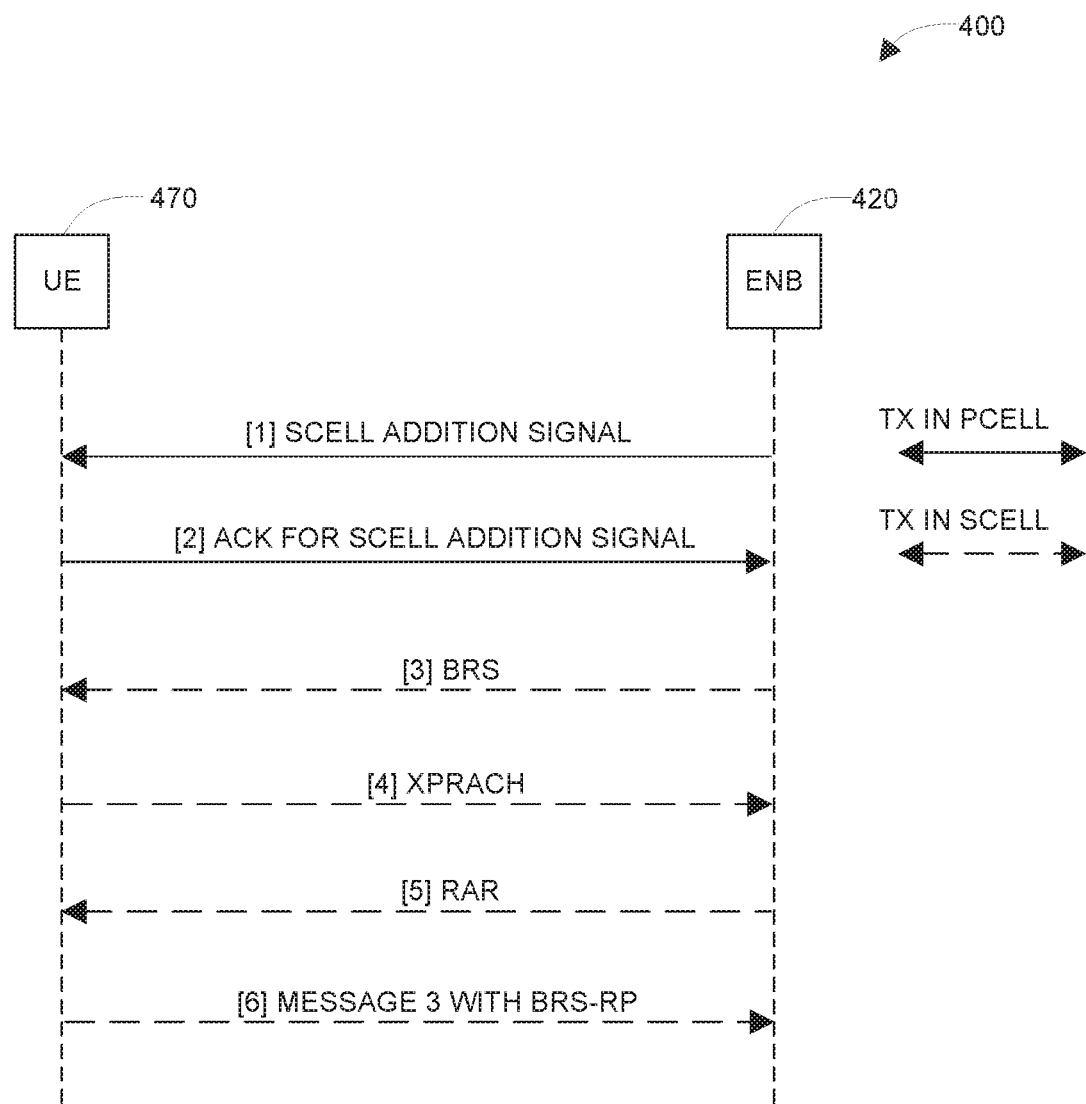
FIG. 4 illustrates a signal diagram to enable a secondary cell in a massive MIMO system in accordance with some embodiments of the disclosure.

FIG. 4 illustrates a signal diagram 400 to enable a secondary cell in a massive MIMO system in accordance with some embodiments of the disclosure. In an example, the SCell beam acquisition/selection can be setup between a UE 470 to an eNodeB 420. The UE 470 may be implemented in the UE 170 of FIG. 1. The eNodeB 420 may be implemented in the eNodeB 120 of FIG. 1.

During the SCell beam acquisition/selection process, a massive MIMO transceiver of the eNodeB 420 may provide a SCell addition signal [1] to the UE 470 via a PCell (e.g., such at the PCell 130 of FIG. 1). The SCell addition signal [1] may include a preamble index. The SCell addition signal [1] may be a RRC message. In response to the SCELL addition signal [1], the UE 470 may provide an acknowledgment [2] to the eNodeB 420 using the PCell. Responsive to receipt of the acknowledgement [2], the eNodeB 420 may provide BRS transmissions [3] to the UE 470 using the SCell. The UE 470 may select a BRS transmission having a highest BRS-RP for the downlink Tx.

The UE 470 may further determine a transmit index based on the selected BRS transmission and the preamble index. The UE 470 may provide xPRACH transmissions [4] having the transmit index to the eNodeB 420 using the SCell. The eNodeB 420 may select one of the xPRACH transmissions as the uplink Tx based on signal strength. The eNodeB 420 may provide a random access response (RAR) [5] to the UE 470 using the SCell to request the selected BRS-RP information for the downlink Tx. Responsive to receipt of the RAR [5] message, the UE 470 may provide a Message 3 that includes the selected BRS-RP information [6] for the downlink. In some examples, SCell transmission by the eNodeB 420 may be via a different eNodeB (e.g., the eNodeB 110 of FIG. 1) than the eNodeB that provided the PCell transmissions. After the Message 3 that includes the selected BRS-RP information [6] is received at the eNodeB 420, the eNodeB 420 may activate or deactivate the SCell using a MAC CE communication with the UE 470.

Figure 5:
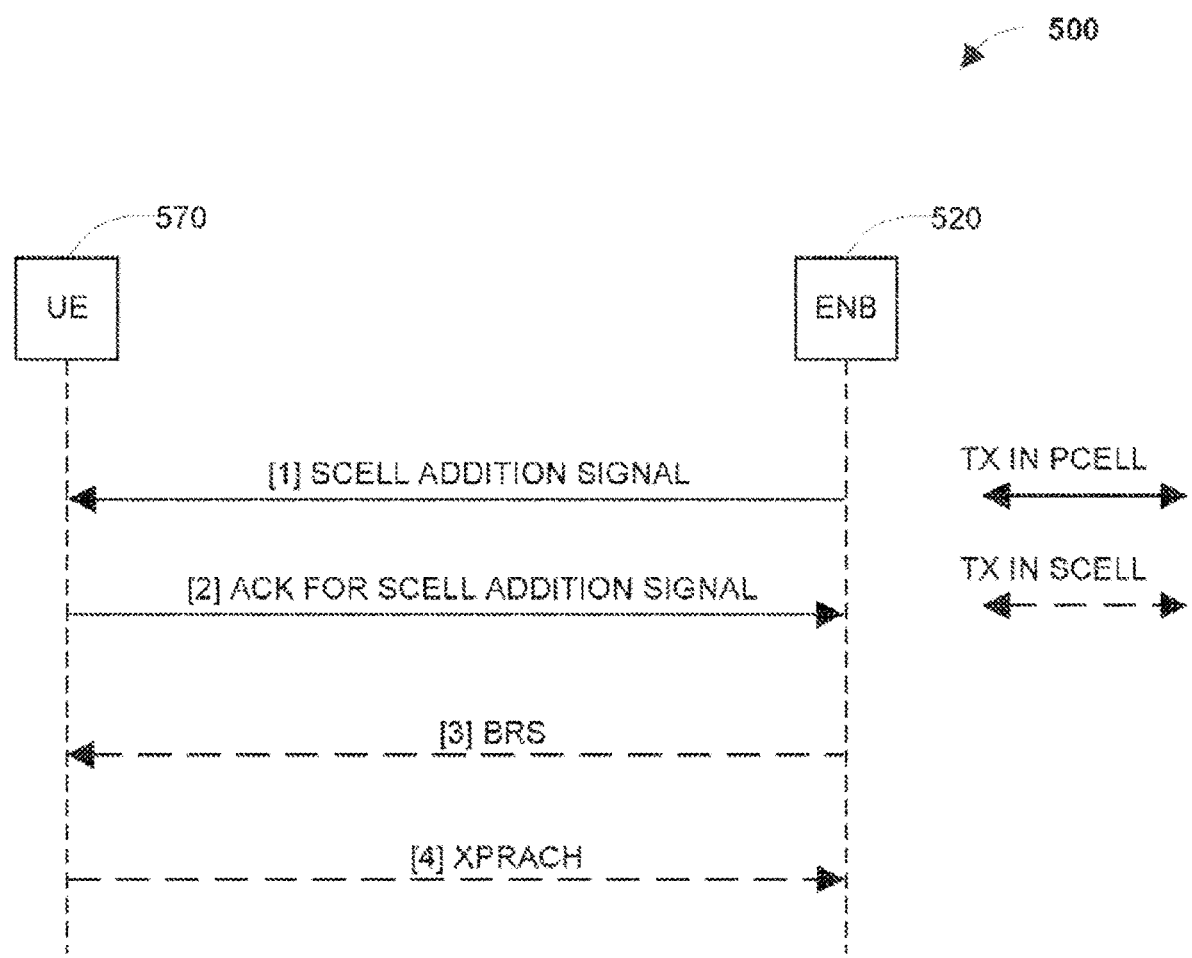
FIG. 5 illustrates a signal diagram to enable a secondary cell in a massive MIMO system in accordance with some embodiments of the disclosure.

FIG. 5 illustrates generally a signal diagram 500 to enable a secondary cell in a massive MIMO system in accordance with some embodiments of the disclosure. In an example, the SCell beam acquisition/selection can be setup between a UE 570 to an eNodeB 520. The UE 570 may be implemented in the UE 170 of FIG. 1. The eNodeB 520 may be implemented in the eNodeB 120 of FIG. 1.

During the SCell beam acquisition/selection process, a massive MIMO transceiver of the eNodeB 520 may provide a SCell addition signal [1] to the UE 570 via a PCell (e.g., such at the PCell 130 of FIG. 1). The SCell addition signal [1] may include a preamble index. The SCell addition signal [1] may be a RRC message. In response to the SCELL addition signal [1], the UE 570 may provide an acknowledgment [2] to the eNodeB 520 using the PCell. Responsive to receipt of the acknowledgement [2], the eNodeB 520 may provide BRS transmissions [3] to the UE 570 using the SCell. The UE 570 may select a BRS transmission having a highest BRS-RP for the downlink Tx.

The UE 570 may further determine a transmit index based on the selected BRS transmission and the preamble index. The UE 570 may provide xPRACH transmissions [4] having the transmit index to the eNodeB 520 using the SCell. The eNodeB 520 may select one of the xPRACH transmissions as the uplink Tx based on signal strength. The eNodeB 52.0 may also determine the BRS-RP information from the transmit index of the selected one of the xPRACH transmissions. In some examples, SCell transmission by the eNodeB 520 may be via a different eNodeB (e.g., the eNodeB 110 of FIG. 1) than the eNodeB that provided the PCell transmissions. After the xPRACH transmissions are received at the eNodeB 520, the eNodeB 520 may activate or deactivate the SCell using a MAC CE communication with the UE 570.

Figure 6:
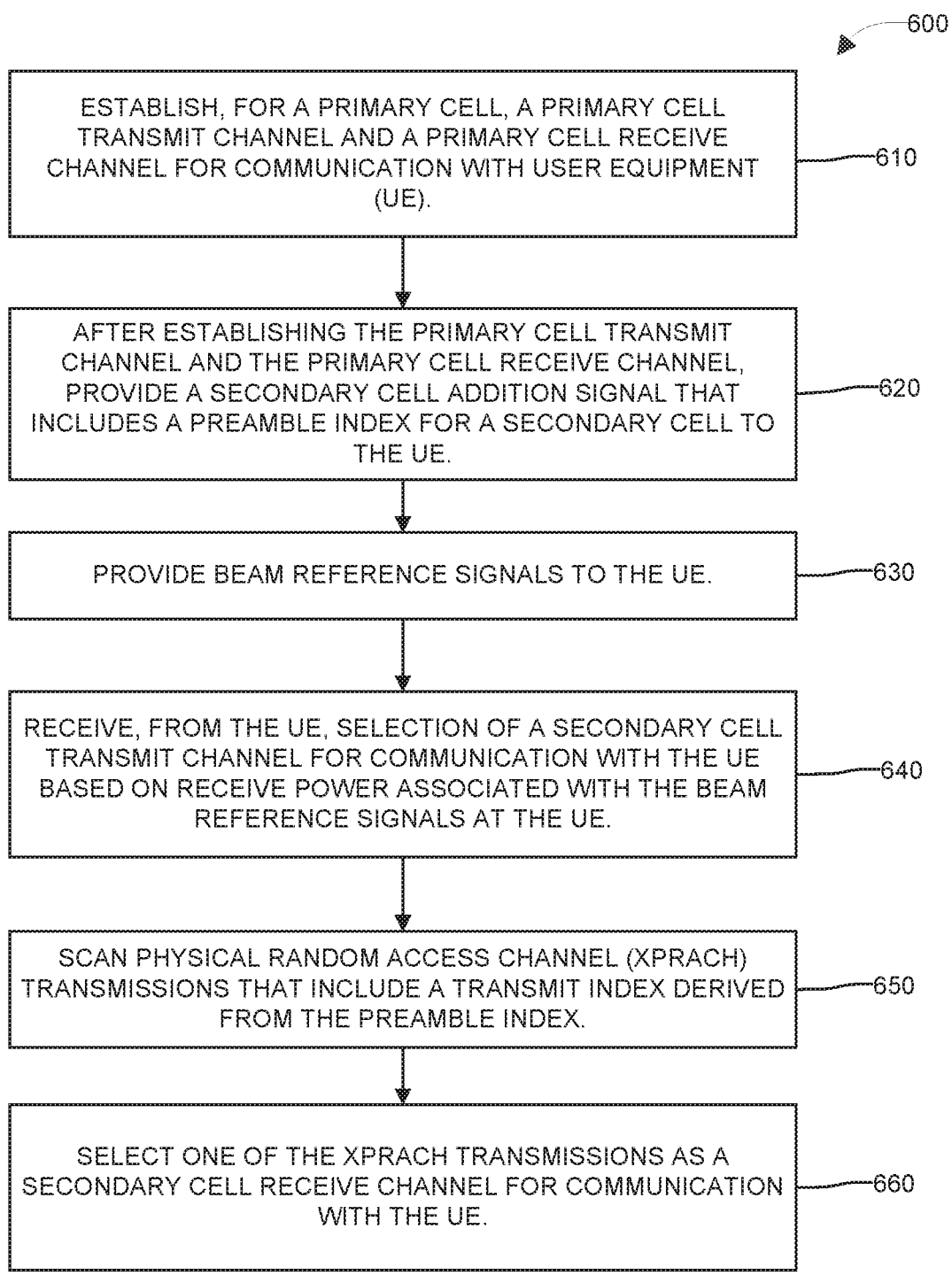
FIG. 6 illustrates a flow diagram of a method to enable a secondary cell in a massive MIMO system in accordance with some embodiments of the disclosure.

FIG. 6 illustrates a flow diagram of a method 600 to enable a secondary cell in a massive MIMO system in accordance with some embodiments of the disclosure. The method 600 may be implemented in any of the eNodeB 110 and/or the eNodeB 120 of FIG. 1, the eNodeB 420 of FIG. 4, the eNodeB 520 of FIG. 5, or combinations thereof.

The method 600 may include establishing, for a primary cell, a primary cell transmit channel (e.g., downlink Tx) and a primary cell receive channel (e.g., uplink Tx) for communication with user equipment (UE), at 610. The UE may include the UE 170 of FIG. 1, the UE 470 of FIG. 4, the UE 570 of FIG. 5, or combinations thereof. The primary cell may include the PCell 130 of FIG. 1.

After establishing the primary cell transmit channel and the primary cell receive channel, the method 600 may include providing a secondary cell addition signal for a secondary cell to the UE, at 620. The secondary cell addition signal may include a preamble index. In some examples, the method 600 may further include, prior to providing the secondary cell addition signal to the UE, determining whether the UE has capability of contemporaneously receiving from one cell and transmitting to a second cell. Provision of the secondary cell addition signal to the UE may be in response to a determination that the UE has the capability of contemporaneously receiving from one cell and transmitting to a second cell. The method 600 may further include receiving an indication that the UE (e.g., such as via RRC signaling from the UE) has the capability of contemporaneously receiving from one cell and transmitting to a second cell.

The method 600 may include providing beam reference signals to the UE, at 630. The method 600 may include receiving, from the UE, selection of a secondary cell transmit channel (e.g., downlink Tx) for communication with the UE based on receive power associated with the beam reference signals at the UE, at 640. The secondary transmit channel may be associated with a secondary cell, such as the SCell 140A or 140B of FIG. 1. Receiving selection of the secondary cell transmit channel for communication with the UE may include receiving the selection of the secondary cell transmit channel via a separate message after selecting the secondary cell receive channel. The method 600 may further include providing a random access response message to the UE to request the separate message from the UE.

The method 600 may include scanning physical random access channel (xPRACH) transmissions, at 650. The xPRACH transmissions may include a transmit index that is derived from the preamble index. The method 600 may include selecting one of the xPRACH transmissions as a secondary cell receive channel (e.g., uplink Tx) for communication with the UE, at 660. In some examples, receiving selection of the secondary cell transmit channel for communication with the UE is via the xPRACH transmissions. The method 600 may further include decoding the transmit index received via the selected one of the xPRACH transmissions to determine the secondary cell transmit channel. The method 600 may further include providing the selected secondary cell receive channel to the UE. The method 600 may further include activating the secondary cell by providing, to the UE, a MAC-CE (e.g., the MAC-CE of FIG. 3) that includes identification of the secondary cell and a preamble index. The method 600 may further include deactivating the secondary cell by providing, to the UE, the MAC-CE that includes identification of the secondary cell and an invalid preamble index.

In some examples, the method 600 may further include initiating replacement of the secondary cell with a different secondary cell responsive receipt of a measurement event message from the UE. The measurement event message may identify a different secondary transmit channel of the different secondary cell. The measurement event may be triggered by the UE in response to a determination that the BRS-RP for the different secondary cell exceeds the BRS-RP for the secondary cell by a threshold amount. The method 600 may further include determining a different secondary receive channel that corresponds to the different secondary transmit channel. The method 600 may further include providing a secondary cell addition signal to the UE, wherein the secondary cell addition signal includes a second preamble index, scanning the xPRACH transmissions, wherein the xPRACH transmissions include a second transmit index that is derived from the second preamble index, and selecting one of the xPRACH transmissions as a different secondary cell receive channel for communication with the UE.

Figure 7:
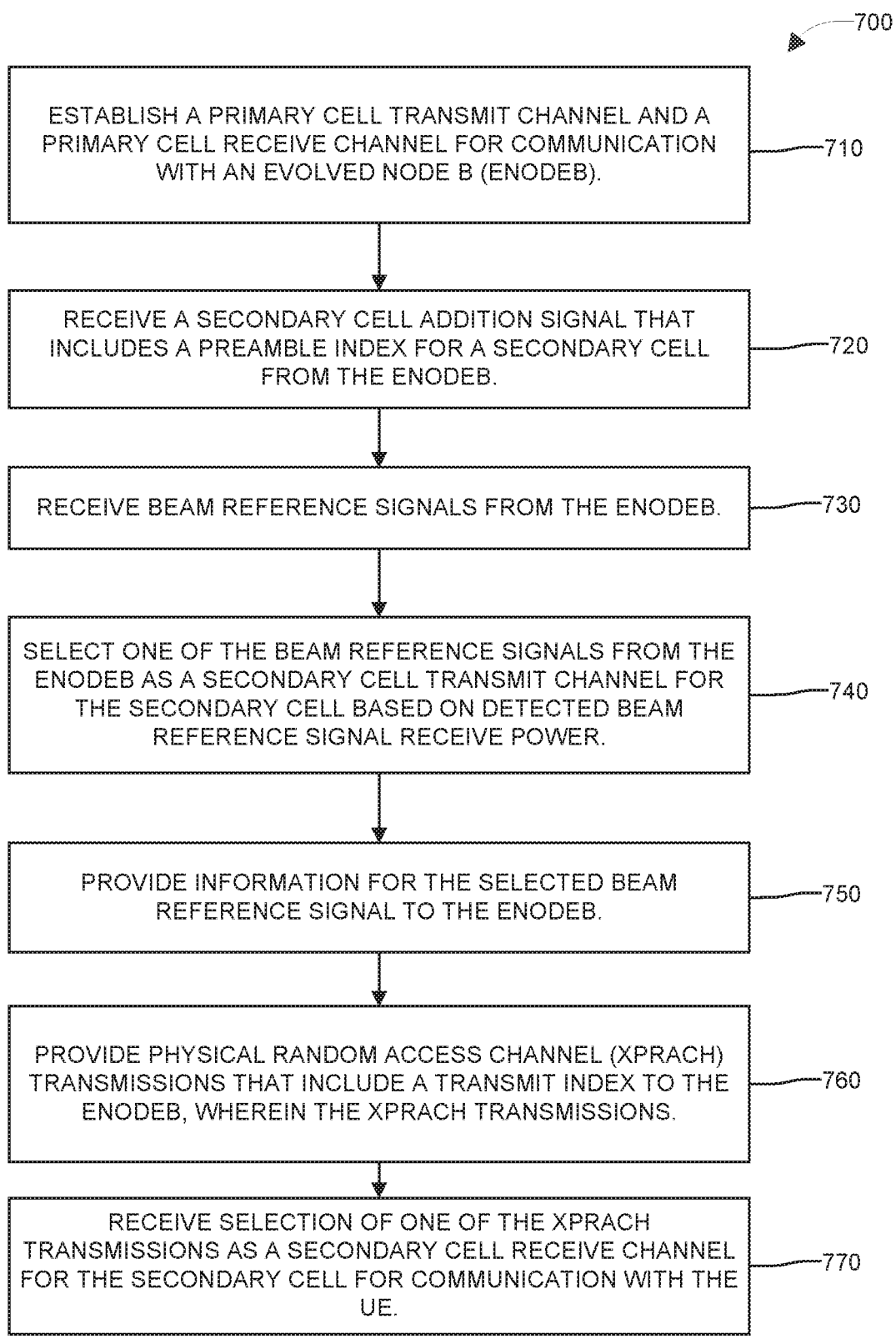
FIG. 7 illustrates a flow diagram of a method to enable a secondary cell in a massive MIMO system in accordance with some embodiments of the disclosure.

FIG. 7 illustrates a flow diagram of a method 700 to enable a secondary cell in a massive MIMO system in accordance with some embodiments of the disclosure. The method 700 may be implemented in any of the UE 170 of FIG. 1, the UE 470 of FIG. 4, the UE 570 of FIG. 5, or combinations thereof.

The method 700 may include establishing a primary cell transmit channel and a primary cell receive channel for communication with an evolved Node B (eNodeB), at 710. The eNodeB may include the eNodeB 110 and/or the eNodeB 120 of FIG. 1, the eNodeB 420 of FIG. 4, the eNodeB 520 of FIG. 5, or combinations thereof. The primary cell may include the PCell 130 of FIG. 1.

After establishing the primary cell transmit channel and the primary cell receive channel, the method 700 may include receiving a secondary cell addition signal for a secondary cell from the eNodeB, at 720. The secondary cell addition signal may include a preamble index. The secondary cell may include the SCell 140A or 140B of FIG. 1. In some examples, the method 700 may further include providing an indication (e.g., such as via RRC signaling) that the UE has a capability to contemporaneously receive information from one cell and transmit information to a second cell, which may be used in a determination as to whether the UE would support enabling a secondary cell.

The method 700 may include receiving beam reference signals from the eNodeB, at 730. The method 700 may include selecting one of the beam reference signals from the eNodeB as a secondary cell transmit channel for the secondary cell based on detected beam reference signal receive power, at 740.

The method 700 may further include providing information for the selected beam reference signal to the eNodeB, at 750. Providing information for the selected beam reference signal to the eNodeB may include providing a separate message that includes identification of the secondary cell transmit channel. In some examples, providing the separate message may be in response to a random access response message from the eNodeB.

The method 700 may include providing physical random access channel (xPRACH) transmissions to the eNodeB, at 760. The xPRACH transmissions may include a transmit index that is derived from the preamble index. In some examples, providing information for the selected beam reference signal to the eNodeB may include encoding the information for the selected beam reference signal in the transmit index.

The method 700 may include receiving selection of one of the xPRACH transmissions as a secondary cell receive channel for the secondary cell for communication with the UE, at 770.

The method 700 may further include initiating replacement of the secondary cell with a different secondary cell responsive to detection of beam reference signal receive power associated with the different secondary cell exceeding the beam reference signal receive power associated with the secondary cell by a threshold amount. In some examples, the method 700 may further include determining selection of a secondary transmit channel that corresponds to the different secondary transmit channel from the eNodeB. In some examples, the method 700 may further include receiving a second secondary cell addition signal, wherein the second secondary cell addition signal includes a second preamble index, providing the xPRACH transmissions to the eNodeB, and receiving selection of one of the xPRACH transmissions as a different secondary cell transmit channel. The xPRACH transmissions may include a second transmit index that is derived from the second preamble index.

Figure 8:
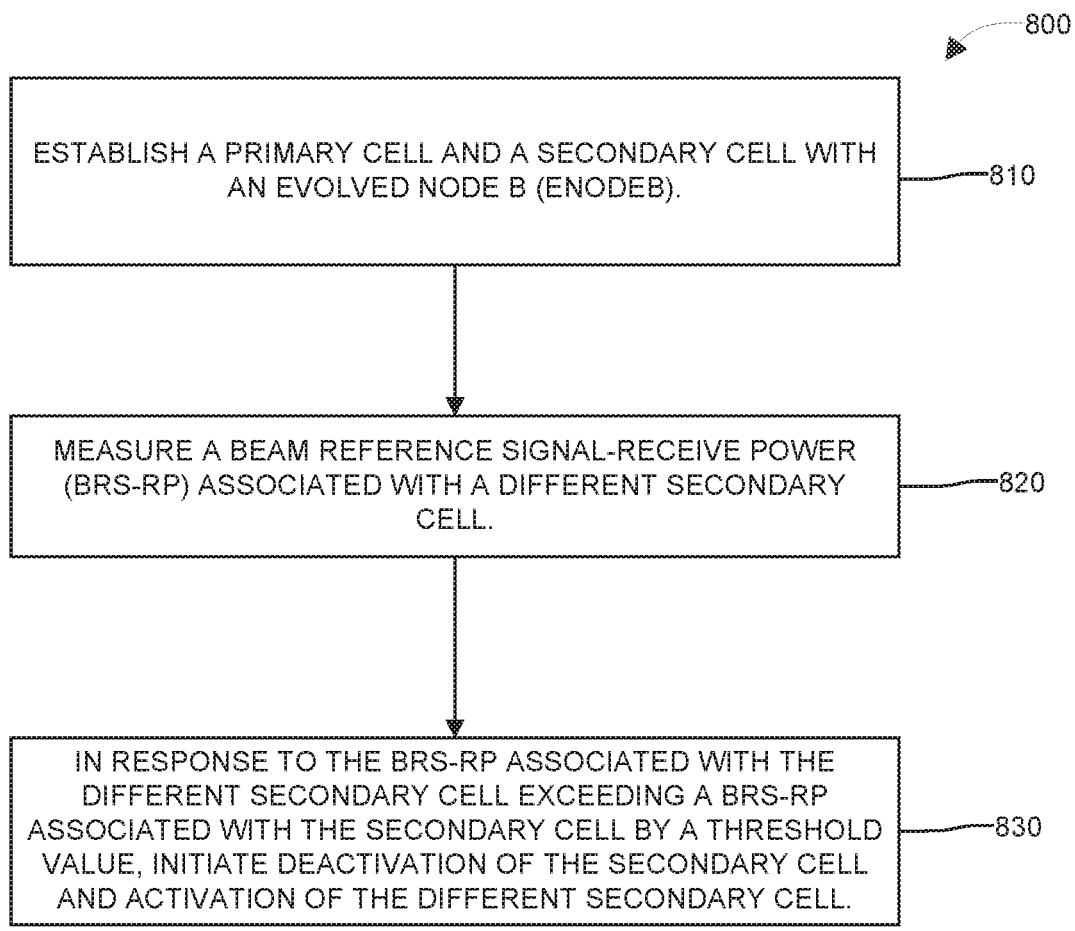
FIG. 8 illustrates a flow diagram of a method to enable a secondary cell in a massive MIMO system in accordance with some embodiments of the disclosure.

FIG. 8 illustrates a flow diagram of a method 800 to enable a secondary cell in a massive MIMO system in accordance with some embodiments of the disclosure. The method 800 may be implemented in any of the UE 170 of FIG. 1, the UE 470 of FIG. 4, the UE 570 of FIG. 5, or combinations thereof.

The method 800 may include establishing a primary cell and a secondary cell with an evolved Node B (eNodeB), at 810. The eNodeB may include the eNodeB 110 and/or the eNodeB 120 of FIG. 1, the eNodeB 420 of FIG. 4, the eNodeB 520 of FIG. 5, or combinations thereof. The primary cell may include the PCell 130 of FIG. 1. The secondary cell may include the SCell 140A or 140B of FIG. 1.

The method 800 may include measuring a beam reference signal-receive power (BRS-RP) associated with a different secondary cell, at 820. In some examples, the different secondary cell may be associated with a different eNodeB (e.g., such as the eNodeB 110 of FIG. 1) than the eNodeB associated with the secondary cell.

The method 800 may include, in response to the BRS-RP associated with the different secondary cell exceeding a BRS-RP associated with the secondary cell by a threshold value, initiate deactivation of the secondary cell and activation of the different secondary cell, at 830. The method 800 may further include receiving the threshold value from the eNodeB via the primary cell. In some examples, the method 800 may include deactivating the secondary cell responsive to reception of a medium access control control element (MAC-CE) with an invalid preamble index. The MAC-CE may have a format of the MAC-CE 300 of FIG. 3. In some examples, the method 800 may further include providing a physical random access channel (xPRACH) transmission for the different secondary cell responsive to receiving the MAC-CE message. The method 800 may further include encoding the xPRACH transmission with a transmit index derived from a preamble index received in the MAC-CE.

Figure 9:
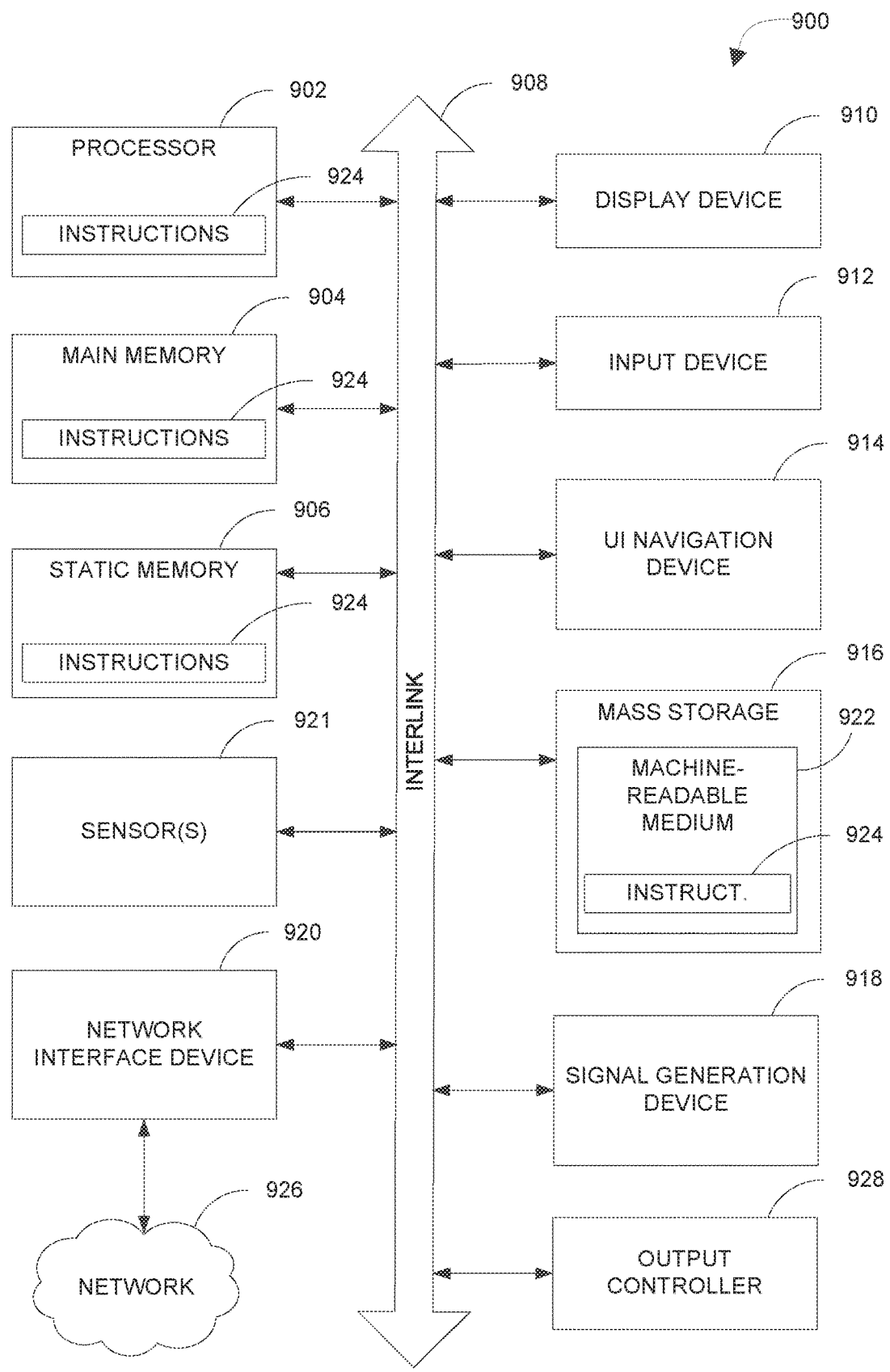
FIG. 9 illustrates a block diagram of a machine in the example form of a computer system in accordance with some embodiments of the disclosure.
Figure 10:
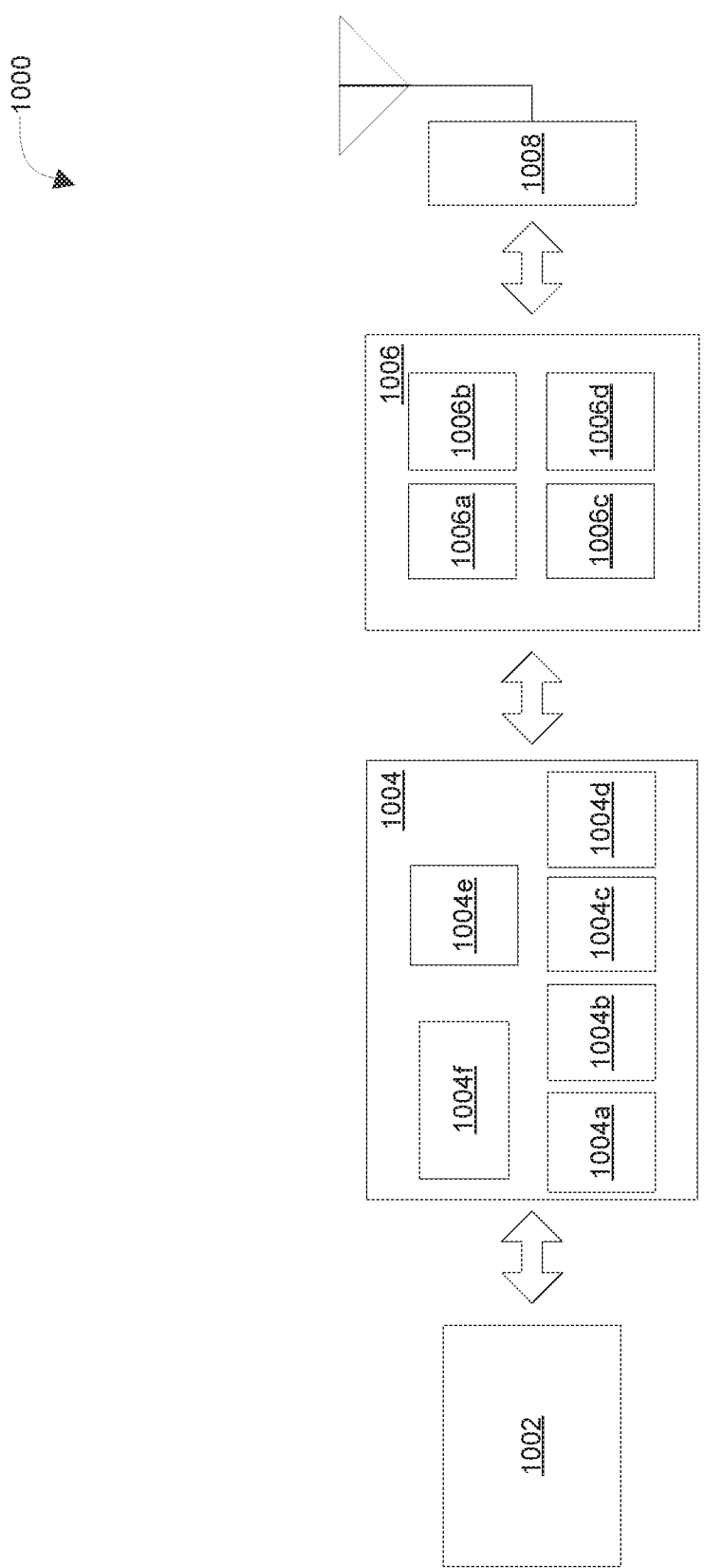
FIG. 10 illustrates a block diagram of components of a User Equipment (UE) device 1000 according to embodiments of the disclosure.

FIG. 9 illustrates generally an example of a block diagram of a machine 900 upon which any one or more of the techniques (e.g., methodologies) discussed herein can perform in accordance with some embodiments. In alternative embodiments, the machine 900 can operate as a standalone device or can be connected (e.g., networked) to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 900 can include a hardware processor 902 (e.g., a central processing unit (CPU), a graphics processing unit (GPU), a hardware processor core, or any combination thereof), a main memory 904 and a static memory 906, some or all of which can communicate with each other via an interlink (e.g., bus) 908. The machine 900 can further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 can be a touch screen display. The machine 900 can additionally include a storage device (e.g., drive unit) 916, a signal generation device 918 (e.g., a speaker), a network interface device 920, and one or more sensors 921, such as a global positioning system (UPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 can include a machine readable medium 922 that is non-transitory on which is stored one or more sets of data structures or instructions 924 (e.g., software) embodying or utilized by any one or more of the techniques or functions described herein. The instructions 924 can also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 can constitute machine readable media.

While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates a block diagram of components of a User Equipment (UE) device 1000 according to embodiments of the disclosure. The UE 1000 may be implemented in the UE 170 of FIG. 1, the UE 470 of FIG. 4, the UE 570 of FIG. 5, or combinations thereof. The UE 1000 may be configured to implement the method 600 of FIG. 6, the method 700 of FIG. 7, the method 800 of FIG. 8, or combinations thereof. In some embodiments, the UE device 1000 may include application circuitry 1002, baseband circuitry 1004, Radio Frequency (RE) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuity 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), preceding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 1004f. The audio DSP(s) 1004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RE circuitry 1006 may also include a transmit signal path which may include circuitry to up-convert baseband signals provided by the baseband circuitry 1004 and provide RE output signals to the FEM circuitry 1008 for transmission.

In some embodiments, the RF circuitry 1006 may include a receive signal path and a transmit signal path. The receive signal path of the RE circuitry 1006 may include mixer circuitry 1006a, amplifier circuitry 1006b and filter circuitry 1006c, The transmit signal path of the RF circuitry 1006 may include filter circuitry 1006c and mixer circuitry 1006a, RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c. The filter circuitry 1006c may include a low-pass filter (LPF), although the scope of the embodiments is not limited in this respect.

In some embodiments, the mixer circuitry 1006a of the receive signal path and the mixer circuitry 1006a of the transmit signal path may include two or more mixers and may be arranged for quadrature downconversion and/or upconversion respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and/or direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a requirement. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter. In some embodiments, the RF circuitry 1006 may include a MIMO transceiver.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RE circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display, camera, sensor, and/or input/output (I/O) interface.

Additional Notes & Examples:

Example 1 is an apparatus of evolved Node B (eNodeB), the apparatus comprising: memory; and processing circuitry, the processing circuitry to configure a massive multiple input, multiple output (MIMO) transceiver to: establish, for a primary cell, a primary cell transmit channel and a primary cell receive channel for communication with user equipment (UE); and after establishment of the primary cell transmit channel and the primary cell receive channel, establish a secondary cell wherein to establish the secondary cell, the processing is configured to: encode a secondary cell addition signal for transmission to the UE, wherein the secondary cell addition signal includes a preamble index; encode beam reference signals for transmission to the UE; decode, from the UE, signaling indicating selection of a secondary cell transmit channel for communication with the UE based on receive power associated with the beam reference signals at the UE; configure the transceiver to scan physical random access channel (xPRACH) transmissions, wherein the xPRACH transmissions include a transmit index that is derived from the preamble index; and select one of the xPRACH transmissions as a secondary cell receive channel for communication with the UE.

In Example 2, the subject matter of Example 1 optionally includes wherein the processing circuitry to configure the MIMO transceiver to establish the secondary cell is in response to the UE having capability of contemporaneously receiving from one cell and transmitting to a second cell.

In Example 3, the subject matter of Example 2 optionally includes wherein the processing circuitry further to configure the MIMO transceiver to receive an indication that the UE has the capability of contemporaneously receiving from one cell and transmitting to a second cell.

In Example 4, the subject matter of Example 3 optionally includes wherein the processing circuitry further to configure the MEMO transceiver to receive an indication that the UE has the capability of contemporaneously receiving from one cell and transmitting to a second cell is via radio resource control (RRC) signaling from the UE.

In Example 5, the subject matter of any one or more of Examples 1-4 optionally include wherein the processing circuitry to configure the MIMO transceiver to receive, from the UE, selection of the secondary cell transmit channel for communication with the UE comprises the processing circuitry to configure the MIMO transceiver to receive the selection of the secondary cell transmit channel via a separate message after selecting the secondary cell receive channel.

In Example 6, the subject matter of Example 5 optionally includes wherein the processing circuitry further to configure the MIMO transceiver to provide a random access response message to the UE to request the separate message from the UE.

In Example 7, the subject matter of any one or more of Examples 1-6 optionally include wherein the processing circuitry to configure the MIMO transceiver to receive, from the UE, selection of the secondary cell transmit channel for communication with the UE comprises the processing circuitry to configure the MIMO transceiver to decode the transmit index received via the selected one of the xPRACH transmissions to determine the secondary cell transmit channel.

In Example 8, the subject matter of any one or more of Examples 1-7 optionally include wherein the processing circuitry further to configure the MIMO transceiver to initiate replacement of the secondary cell with a different secondary cell responsive receipt of a measurement event message from the UE.

In Example 9, the subject matter of Example 8 optionally includes wherein the measurement event message identifies a different secondary transmit channel of the different secondary cell.

In Example 10, the subject matter of Example 9 optionally includes wherein the processing circuitry further to config-ure the MIMO transceiver to determine a different secondary receive channel that corresponds to the different secondary transmit channel.

In Example 11, the subject matter of any one or more of Examples 9-10 optionally include wherein the processing circuitry further to configure the MIMO transceiver to: provide a second secondary cell addition signal to the UE, wherein the second secondary cell addition signal includes a second preamble index; scan the xPRACH transmissions, wherein the xPRACH transmissions include a second transmit index that is derived from the second preamble index; and select one of the xPRACH transmissions as a different secondary cell receive channel for communication with the UE.

In Example 12, the subject matter of any one or more of Examples 9-11 optionally include wherein the processing circuitry further to configure the MIMO transceiver to provide the selected secondary cell receive channel to the UT.

In Example 13, the subject matter of any one or more of Examples 1-12 optionally include wherein the processing circuitry further to configure the MIMO transceiver to provide, to the UE, a medium access control control element that includes identification of the secondary cell and a preamble index to activate the secondary cell.

In Example 14, the subject matter of any one or more of Examples 1-13 optionally include wherein the processing circuitry further to configure the MIMO transceiver to provide, to the UE, a medium access control control element that includes identification of the secondary cell and an invalid preamble index to deactivate the secondary cell.

Example 15 is an apparatus of User Equipment (UE), the apparatus comprising: memory and processing circuitry, the processing circuitry to: configure a multiple input, multiple output (MIMO) transceiver to: establish a primary cell transmit channel and a primary cell receive channel for communication with an eNodeB; and receive a secondary cell addition signal for a secondary cell from the eNodeB, wherein the secondary cell addition signal includes a preamble index; receive beam reference signals from the eNodeB; select one of the beam reference signals from the eNodeB as a secondary cell transmit channel for the secondary cell based on detected beam reference signal receive power; provide information for the selected beam reference signal to the eNodeB; provide physical random access channel (xPRACH) transmissions to the eNodeB, wherein the xPRACH transmissions include a transmit index that is derived from the preamble index; and receive selection of one of the xPRACH transmissions as a secondary cell receive channel for the secondary cell for communication with the UE.

In Example 16, the subject matter of Example 15 optionally includes wherein the processing circuitry further to configure the MIMO transceiver further to provide an indication that the UE has a capability to contemporaneously receive information from one cell and transmit information to a second cell.

In Example 17, the subject matter of Example 16 optionally includes wherein the indication that the UE has the capability of contemporaneously receiving from one cell and transmitting to the second cell is a radio resource control (RRC) signal.

In Example 18, the subject matter of any one or more of Examples 15-17 optionally include wherein the processing circuitry further to configure the MIMO transceiver to provide information for the selected beam reference signal to the eNodeB comprises providing a separate message that includes identification of the secondary cell transmit channel.

In Example 19, the subject matter of Example 18 optionally includes wherein the processing circuitry further to configure the MIMO transceiver is further to provide the separate message in response to a random access response message from the eNodeB.

In Example 20, the subject matter of any one or more of Examples 15-19 optionally include wherein the processing circuitry further to configure the MIMO transceiver is further to provide selection of the secondary cell transmit channel encoded in the transmit index.

In Example 21, the subject matter of any one or more of Examples 15-20 optionally include wherein the processing circuitry further to configure the MIMO transceiver is further to initiate replacement of the secondary cell with a different secondary cell responsive to detection of beam reference signal receive power associated with the different secondary cell exceeding the beam reference signal receive power associated with the secondary cell by a threshold amount.

In Example 22, the subject matter of Example 21 optionally includes wherein the processing circuitry further to configure the MIMO transceiver is further to determine selection of a secondary transmit channel that corresponds to the different secondary transmit channel from the eNodeB.

In Example 23, the subject matter of any one or more of Examples 21-22 optionally include wherein the processing circuitry further to configure the MIMO transceiver is further to: receive a second secondary cell addition signal, wherein the second secondary cell addition signal includes a second preamble index; provide the xPRACH transmissions to the eNodeB, wherein the xPRACH transmissions include a second transmit index that is derived from the second preamble index; and receive selection of one of the xPRACH transmissions as a different secondary cell transmit channel.

In Example 24, the subject matter of any one or more of Examples 15-23 optionally include a plurality of antennas configured to provide and receive wireless signals; RF circuitry including the MIMO transceiver to provide and receive the primary cell signals and the secondary cell signals as the wireless signals; and a baseband processor to communicate with the front end module, the front end module including the processing circuitry.

Example 25 is at least one machine-readable medium including instructions to enable a secondary cell, which when executed by a machine, cause the machine to: establish, for a primary cell, a primary cell transmit channel and a primary cell receive channel for communication with user equipment (UE); and after establishment of the primary cell transmit channel and the primary cell receive channel: provide a secondary cell addition signal for a secondary cell to the UE, wherein the secondary cell addition signal includes a preamble index; provide beam reference signals to the UE; receive, from the UE, selection of a secondary cell transmit channel for communication with the UE based on receive power associated with the beam reference signals at the UE; scan physical random access channel (xPRACH) transmissions, wherein the xPRACH transmissions include a transmit index that is derived from the preamble index; and select one of the xPRACH transmissions as a secondary cell receive channel for communication with the UE.

In Example 26, the subject matter of Example 25 optionally includes instructions, which when executed by a machine, cause the machine to, prior to providing the secondary cell addition signal to the UE, determine whether the UE has capability of contemporaneously receiving from one cell and transmitting to a second cell, wherein provision of the secondary cell addition signal to the UE is in response to a determination that the UE has the capability of contemporaneously receiving from one cell and transmitting to a second cell.

In Example 27, the subject matter of Example 26 optionally includes instructions, which when executed by a machine, cause the machine to receive an indication that the UE has the capability of contemporaneously receiving from one cell and transmitting to a second cell.

In Example 28, the subject matter of Example 27 optionally includes wherein reception of an indication that the UE has the capability of contemporaneously receiving from one cell and transmitting to a second cell is via radio resource control (RRC) signaling from the UE.

In Example 29, the subject matter of any one or more of Examples 25-28 optionally include wherein reception of selection of the secondary cell transmit channel for communication with the UE includes instructions, which when executed by a machine, cause the machine to receive the selection of the secondary cell transmit channel via a separate message after selecting the secondary cell receive channel.

In Example 30, the subject matter of Example 29 optionally includes instructions, which when executed by a machine, cause the machine to provide a random access response message to the UE to request the separate message from the UE.

In Example 31, the subject matter of any one or more of Examples 25-30 optionally include wherein reception of selection of the secondary cell transmit channel for communication with the UE is via the xPRACH transmissions, the at least one machine-readable medium further including instructions, which when executed by a machine, cause the machine to decode the transmit index received via the selected one of the xPRACH transmissions to determine the secondary cell transmit channel.

In Example 32, the subject matter of any one or more of Examples 25-31 optionally include instructions, which when executed by a machine, cause the machine to initiate replacement of the secondary cell with a different secondary cell responsive receipt of a measurement event message from the UE.

In Example 33, the subject matter of Example 32 optionally includes wherein the measurement event message identifies a different secondary transmit channel of the different secondary cell.

In Example 34, the subject matter of Example 33 optionally includes instructions, which when executed by a machine, cause the machine to determine a different secondary receive channel that corresponds to the different secondary transmit channel.

In Example 35, the subject matter of any one or more of Examples 33-34 optionally include instructions, which when executed by a machine, cause the machine to: provide a secondary cell addition signal to the UE, wherein the secondary cell addition signal includes a second preamble index; scan the xPRACH transmissions, wherein the xPRACH transmissions include a second transmit index that is derived from the second preamble index; and select one of the xPRACH transmissions as a different secondary cell receive channel for communication with the UE.

In Example 36, the subject matter of any one or more of Examples 33-35 optionally include instructions, which when executed by a machine, cause the machine to provide the selected secondary cell receive channel to the UE.

In Example 37, the subject matter of any one or more of Examples 25-36 optionally include instructions, which when executed by a machine, cause the machine to activate the secondary cell by providing, to the UE, a medium access control control element that includes identification of the secondary cell and a preamble index.

In Example 38, the subject matter of any one or more of Examples 25-37 optionally include instructions, which when executed by a machine, cause the machine to deactivate the secondary cell by providing, to the UE, a medium access control control element that includes identification of the secondary cell and an invalid preamble index.

Example 39 is at least one machine-readable medium including instructions to enable a secondary cell, which when executed by a machine, cause the machine to: establish a primary cell transmit channel and a primary cell receive channel for communication with an evolved Node B (eNodeB); and receive a secondary cell addition signal for a secondary cell from the eNodeB, wherein the secondary cell addition signal includes a preamble index; receive beam reference signals from the eNodeB; select one of the beam reference signals from the eNodeB as a secondary cell transmit channel for the secondary cell based on detected beam reference signal receive power; provide information for the selected beam reference signal to the eNodeB; provide physical random access channel (xPRACH) transmissions to the eNodeB, wherein the xPRACH transmissions include a transmit index that is derived from the preamble index; and receive selection of one of the xPRACH transmissions as a secondary cell receive channel for the secondary cell for communication with the UE.

In Example 40, the subject matter of Example 39 optionally includes instructions, which when executed by a machine, cause the machine to provide an indication that the UE has a capability to contemporaneously receive information from one cell and transmit information to a second cell.

In Example 41, the subject matter of Example 40 optionally includes wherein the indication that the UE has the capability of contemporaneously receiving from one cell and transmitting to the second cell is a radio resource control (RRC) signal.

In Example 42, the subject matter of any one or more of Examples 39-41 optionally include wherein provision of information for the selected beam reference signal to the eNodeB includes instructions, which when executed by a machine, cause the machine to provide a separate message that includes identification of the secondary cell transmit channel.

In Example 43, the subject matter of Example 42 optionally includes instructions, which when executed by a machine, cause the machine to provide the separate message in response to a random access response message from the eNodeB.

In Example 44, the subject matter of any one or more of Examples 39-43 optionally include wherein provision of information for the selected beam reference signal to the eNodeB includes instructions, which when executed by a machine, cause the machine to encode the information for the selected beam reference signal in the transmit index.

In Example 45, the subject matter of any one or more of Examples 39-44 optionally include instructions, which when executed by a machine, cause the machine to initiate replacement of the secondary cell with a different secondary cell responsive to detection of beam reference signal receive power associated with the different secondary cell exceeding the beam reference signal receive power associated with the secondary cell by a threshold amount.

In Example 46, the subject matter of Example 45 optionally includes instructions, which when executed by a machine, cause the machine to determine selection of a secondary transmit channel that corresponds to the different secondary transmit channel from the eNodeB.

In Example 47, the subject matter of any one or more of Examples 45-46 optionally include instructions, which when executed by a machine, cause the machine to: receive a second secondary cell addition signal, wherein the second secondary cell addition signal includes a second preamble index; provide the xPRACH transmissions to the eNodeB, wherein the xPRACH transmissions include a second transmit index that is derived from the second preamble index; and receive selection of one of the xPRACH transmissions as a different secondary cell transmit channel.

Example 48 is at least one machine-readable medium including instructions to enable a secondary cell, which when executed by a machine, cause the machine to: establish a primary cell and a secondary cell with an evolved Node B (eNodeB); measure a beam reference signal-receive power (BRS-RP) associated with a different secondary cell; and in response to the BRS-RP associated with the different secondary cell exceeding a BRS-RP associated with the secondary cell by a threshold value, initiate deactivation of the secondary cell and activation of the different secondary cell.

In Example 49, the subject matter of Example 48 optionally includes instructions, which when executed by a machine, cause the machine to receive the threshold value from the eNodeB via the primary cell.

In Example 50, the subject matter of any one or more of Examples 48-49 optionally include instructions, which when executed by a machine, cause the machine to deactivate the secondary cell responsive to reception of a medium access control control element (MAC-CE) with an invalid preamble index.

In Example 51, the subject matter of any one or more of Examples 48-50 optionally include instructions, which when executed by a machine, cause the machine to provide a physical random access channel (xPRACH) transmission for the different secondary cell responsive to receiving the MAC-CE message.

In Example 52, the subject matter of Example 51 optionally includes instructions, which when executed by a machine, cause the machine to encode the xPRACH transmission with a transmit index derived from a preamble index received in the MAC-CE.

In Example 53, the subject matter of any one or more of Examples 48-52 optionally include wherein the different secondary cell is associated with a different eNodeB than the eNodeB associated with the secondary cell.

Example 54 is an apparatus of evolved Node B (eNodeB) comprising: means for establishing, for a primary cell, a primary cell transmit channel and a primary cell receive channel for communication with user equipment (UE); and after establishment of the primary cell transmit channel and the primary cell receive channel: means for providing a secondary cell addition signal for a secondary cell to the UE, wherein the secondary cell addition signal includes a preamble index; means for providing beam reference signals to the UE; means for receiving, from the UE, selection of a secondary cell transmit channel for communication with the UE based on receive power associated with the beam reference signals at the UE; means for scanning physical random access channel (xPRACH) transmissions, wherein the xPRACH transmissions include a transmit index that is derived from the preamble index; and means for selecting one of the xPRACH transmissions as a secondary cell receive channel for communication with the UE.

In Example 55, the subject matter of Example 54 optionally includes prior to provision of the secondary cell addition signal to the UE, means for determining whether the UE has capability of contemporaneously receiving from one cell and transmitting to a second cell, wherein provision of the secondary cell addition signal to the UE is in response to a determination that the UE has the capability of contemporaneously receiving from one cell and transmitting to a second cell.

In Example 56, the subject matter of Example 55 optionally includes means for receiving an indication that the UE has the capability of contemporaneously receiving from one cell and transmitting to a second cell.

In Example 57, the subject matter of Example 56 optionally includes wherein means for receiving an indication that the UE has the capability of contemporaneously receiving from one cell and transmitting to a second cell is via radio resource control (RRC) signaling from the UE.

In Example 58, the subject matter of any one or more of Examples 54-57 optionally include wherein means for receiving selection of the secondary cell transmit channel for communication with the UE comprises means for receiving the selection of the secondary cell transmit channel via a separate message after selecting the secondary cell receive channel.

In Example 59, the subject matter of Example 58 optionally includes means for providing a random access response message to the UE to request the separate message from the UE.

In Example 60, the subject matter of any one or more of Examples 54-59 optionally include wherein means for receiving selection of the secondary cell transmit channel for communication with the UE is via the xPRACH transmissions, the apparatus further comprising means for decoding the transmit index received via the selected one of the xPRACH transmissions to determine the secondary cell transmit channel.

In Example 61, the subject matter of any one or more of Examples 54-60 optionally include means for initiating replacement of the secondary cell with a different secondary cell responsive receipt of a measurement event message from the UE.

In Example 62, the subject matter of Example 61 optionally includes wherein the measurement event message identifies a different secondary transmit channel of the different secondary cell.

In Example 63, the subject matter of Example 62 optionally includes means for determining a different secondary receive channel that corresponds to the different secondary transmit channel.

In Example 64, the subject matter of any one or more of Examples 62-63 optionally include means for providing a secondary cell addition signal to the UE, wherein the secondary cell addition signal includes a second preamble index; means for scanning the xPRACH transmissions, wherein the xPRACH transmissions include a second transmit index that is derived from the second preamble index; and means for selecting one of the xPRACH transmissions as a different secondary cell receive channel for communication with the UE.

In Example 65, the subject matter of any one or more of Examples 62-64 optionally include means for providing the selected secondary cell receive channel to the UE.

In Example 66, the subject matter of any one or more of Examples 54-65 optionally include means for activating the secondary cell by providing, to the UE, a medium access control control element that includes identification of the secondary cell and a preamble index.

In Example 67, the subject matter of any one or more of Examples 54-66 optionally include means for deactivating the secondary cell by provision of, to the UE, a medium access control control element that includes identification of the secondary cell and an invalid preamble index.

Example 68 is an apparatus of User Equipment (UE) comprising: means for establishing a primary cell transmit channel and a primary cell receive channel for communication with an evolved Node B (eNodeB); and means for receiving a secondary cell addition signal for a secondary cell from the eNodeB, wherein the secondary cell addition signal includes a preamble index; means for receiving beam reference signals from the eNodeB; means for selecting one of the beam reference signals from the eNodeB as a secondary cell transmit channel for the secondary cell based on detected beam reference signal receive power; means for providing information for the selected beam reference signal to the eNodeB; means for providing physical random access channel (xPRACH) transmissions to the eNodeB, wherein the xPRACH transmissions include a transmit index that is derived from the preamble index; and means for receiving selection of one of the xPRACH transmissions as a secondary cell receive channel for the secondary cell for communication with the UE.

In Example 69, the subject matter of Example 68 optionally includes means for providing an indication that the UE has a capability to contemporaneously receive information from one cell and transmit information to a second cell.

In Example 70, the subject matter of Example 69 optionally includes wherein the indication that the UE has the capability of contemporaneously receiving from one cell and transmitting to the second cell is a radio resource control (RRC) signal.

In Example 71, the subject matter of any one or more of Examples 68-70 optionally include wherein means for providing information for the selected beam reference signal to the eNodeB comprises providing a separate message that includes identification of the secondary cell transmit channel.

In Example 72, the subject matter of Example 71 optionally includes means for providing the separate message in response to a random access response message from the eNodeB.

In Example 73, the subject matter of any one or more of Examples 68-72 optionally include wherein means for providing information for the selected beam reference signal to the eNodeB comprises means for encoding the information for the selected beam reference signal in the transmit index.

In Example 74, the subject matter of any one or more of Examples 68-73 optionally include means for initiating replacement of the secondary cell with a different secondary cell responsive to detection of beam reference signal receive power associated with the different secondary cell exceeding the beam reference signal receive power associated with the secondary cell by a threshold amount.

In Example 75, the subject matter of Example 74 optionally includes means for determining selection of a secondary transmit channel that corresponds to the different secondary transmit channel from the eNodeB.

In Example 76, the subject matter of any one or more of Examples 74-75 optionally include means for receiving a second secondary cell addition signal, wherein the second secondary cell addition signal includes a second preamble index; means for providing the xPRACH transmissions to the eNodeB, wherein the xPRACH transmissions include a second transmit index that is derived from the second preamble index; and means for receiving selection of one of the xPRACH transmissions as a different secondary cell transmit channel.

Example 77 is an apparatus of User Equipment (UE) comprising: means for establishing a primary cell and a secondary cell with an evolved Node B (eNodeB); means for measuring a beam reference signal-receive power (BRS-RP) associated with a different secondary cell; and in response to the BRS-RP associated with the different secondary cell exceeding a BRS-RP associated with the secondary cell by a threshold value, means for initiating deactivation of the secondary cell and activation of the different secondary cell.

In Example 78, the subject matter of Example 77 optionally includes means for receiving the threshold value from the eNodeB via the primary cell.

In Example 79, the subject matter of any one or more of Examples 77-78 optionally include means for deactivating the secondary cell responsive to reception of a medium access control control element (MAC-CE) with an invalid preamble index.

In Example 80, the subject matter of any one or more of Examples 77-79 optionally include means for providing a physical random access channel (xPRACH) transmission for the different secondary cell responsive to receiving the MAC-CE message.

In Example 81, the subject matter of Example 80 optionally includes means for encoding the xPRACH transmission with a transmit index derived from a preamble index received in the MAC-CE.

In Example 82, the subject matter of any one or more of Examples 77-81 optionally include wherein the different secondary cell is associated with a different eNodeB than the eNodeB associated with the secondary cell.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 172(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a base station, the apparatus comprising:
    memory; and processing circuitry, the processing circuitry configured to cause a massive multiple input, multiple output (MIMO) transceiver to:
        establish, for a primary cell, a primary cell transmit channel and a primary cell receive channel for communication with user equipment (UE); and
        after establishment of the primary cell transmit channel and the primary cell receive channel, establish a secondary cell wherein to establish the secondary cell, the processing circuitry is further configured to cause the massive MIMO transceiver to:
            encode a secondary cell addition signal for transmission to the UE, wherein the secondary cell addition signal includes a preamble index;
            encode beam reference signals for transmission to the UE;
            decode, from the UE, signaling indicating selection of a secondary cell transmit channel for communication with the UE based on receive power associated with the beam reference signals at the UE;
            configure the transceiver to scan physical random access channel (xPRACH) transmissions, wherein the xPRACH transmissions include a transmit index that is derived from the preamble index; and
            select one of the xPRACH transmissions as a secondary cell receive channel for communication with the UE.

2. The apparatus of claim 1, wherein the processing circuitry is further configured to cause the massive MIMO transceiver to establish the secondary cell is in response to the UE having capability of contemporaneously receiving from one cell and transmitting to a second cell.

3. The apparatus of claim 2, wherein the processing circuitry is further configured to cause the massive MIMO transceiver to receive an indication that the UE has the capability of contemporaneously receiving from one cell and transmitting to a second cell.

4. The apparatus of claim 3, wherein the processing circuitry is further configured to cause the massive MIMO transceiver to receive an indication that the UE has the capability of contemporaneously receiving from one cell and transmitting to a second cell is via radio resource control (RRC) signaling from the UE.

5. The apparatus of claim 1, wherein the processing circuitry is further configured to cause the massive MIMO transceiver to receive, from the UE, selection of the secondary cell transmit channel for communication with the UE comprises the processing circuitry to configure the massive MIMO transceiver to receive the selection of the secondary cell transmit channel via a separate message after selecting the secondary cell receive channel.

6. The apparatus of claim 5, wherein the processing circuitry is further configured to cause the massive MIMO transceiver to provide a random access response message to the UE to request the separate message from the UE.

7. The apparatus of claim 1, wherein the processing circuitry is further configured to cause the massive MIMO transceiver to receive, from the UE, selection of the secondary cell transmit channel for communication with the UE comprises the processing circuitry to configure the MIMO transceiver to decode the transmit index received via the selected one of the xPRACH transmissions to determine the secondary cell transmit channel.

8. The apparatus of claim 1, wherein the processing circuitry is further configured to cause the massive MIMO transceiver to initiate replacement of the secondary cell with a different secondary cell responsive receipt of a measurement event message from the UE.

9. The apparatus of claim 8, wherein the measurement event message identifies a different secondary transmit channel of the different secondary cell.

10. The apparatus of claim 9, wherein the processing circuitry is further configured to cause the massive MIMO transceiver to determine a different secondary receive channel that corresponds to the different secondary transmit channel.

11. The apparatus of claim 9, wherein the processing circuitry is further configured to cause the massive MIMO transceiver to:
provide a second secondary cell addition signal to the UE, wherein the second secondary cell addition signal includes a second preamble index;
scan the xPRACH transmissions, wherein the xPRACH transmissions include a second transmit index that is derived from the second preamble index; and
select one of the xPRACH transmissions as a different secondary cell receive channel for communication with the UE.

12. The apparatus of claim 9, wherein the processing circuitry is further configured to cause the massive MIMO transceiver to provide the selected secondary cell receive channel to the UE.

13. An apparatus of User Equipment (UE), the apparatus comprising:
memory and processing circuitry, the processing circuitry configured to cause a multiple input, multiple output (MIMO) transceiver to:
establish a primary cell transmit channel and a primary cell receive channel for communication with a base station; and
receive a secondary cell addition signal for a secondary cell from the base station, wherein the secondary cell addition signal includes a preamble index;
receive beam reference signals from the base station;
select one of the beam reference signals from the base station as a secondary cell transmit channel for the secondary cell based on detected beam reference signal receive power;
provide information for the selected beam reference signal to the base station;
provide physical random access channel (xPRACH) transmissions to the base station, wherein the xPRACH transmissions include a transmit index that is derived from the preamble index; and
receive selection of one of the xPRACH transmissions as a secondary cell receive channel for the secondary cell for communication with the UE.

14. The apparatus of claim 13, wherein the processing circuitry is further configured to cause the MIMO transceiver to provide an indication that the UE has a capability to contemporaneously receive information from one cell and transmit information to a second cell.

15. The apparatus of claim 14, wherein the indication that the UE has the capability of contemporaneously receiving from one cell and transmitting to the second cell is a radio resource control (RRC) signal.

16. The apparatus of claim 13, wherein the processing circuitry is further configured to cause the MIMO transceiver to provide information for the selected beam reference signal to the base station, wherein to provide the information comprises providing a separate message that includes identification of the secondary cell transmit channel.

17. The apparatus of claim 16, wherein the processing circuitry is further configured to cause the MIMO transceiver to provide the separate message in response to a random access response message from the base station.

18. The apparatus of claim 13, wherein the processing circuitry is further configured to cause the MIMO transceiver to provide selection of the secondary cell transmit channel encoded in the transmit index.

19. The apparatus of claim 13, the apparatus further comprising:
a plurality of antennas configured to provide and receive wireless signals;
RF circuitry including the MIMO transceiver to provide and receive primary cell
signals and secondary cell signals as the wireless signals; and
a baseband processor to communicate with a front end module, the front end module including the processing circuitry.

20. A user equipment device (UE), comprising:
a multiple input, multiple output (MIMO) transceiver; and
a processor operably coupled to the MIMO transceiver and configured to cause the UE to:
establish a primary cell transmit channel and a primary cell receive channel for communication with a base station; and
receive a secondary cell addition signal for a secondary cell from the base station, wherein the secondary cell addition signal includes a preamble index;
receive beam reference signals from the base station;

select one of the beam reference signals from the base station as a secondary cell transmit channel for the secondary cell based on detected beam reference signal receive power;

provide information for the selected beam reference signal to the base station;

provide physical random access channel (xPRACH) transmissions to the base station, wherein the xPRACH transmissions include a transmit index that is derived from the preamble index; and receive selection of one of the xPRACH transmissions as a secondary cell receive channel for the secondary cell for communication with the UE.

21. The UE of claim 20, wherein the processor is further configured to cause the UE to provide information for the selected beam reference signal to the base station, wherein to provide the information comprises providing a separate message that includes identification of the secondary cell transmit channel.

22. The UE of claim 21, wherein the processor is further configured to cause the UE to provide the separate message in response to a random access response message from the base station.

23. The UE of claim 20, wherein the processor is further configured to cause the UE to provide selection of the secondary cell transmit channel encoded in the transmit index.

* * * * *